(12) United States Patent
Coppock

(10) Patent No.: US 7,021,395 B1
(45) Date of Patent: Apr. 4, 2006

(54) WEEDER TOOL ATTACHMENT

(76) Inventor: Christopher C. Coppock, 4130 La Jolla Village Dr., #107186, La Jolla, CA (US) 92037

( * ) Notice: Subject to any disclaimer, the term of this patent is extended or adjusted under 35 U.S.C. 154(b) by 0 days.

(21) Appl. No.: 10/924,754

(22) Filed: Aug. 24, 2004

Related U.S. Application Data

(60) Provisional application No. 60/498,499, filed on Aug. 28, 2003.

(51) Int. Cl.
*A01B 1/00* (2006.01)
(52) U.S. Cl. ........................ 172/371; 172/378
(58) Field of Classification Search .......... 172/13, 172/371, 372, 373, 374, 375, 378, 380, 381; 7/114
See application file for complete search history.

(56) References Cited

U.S. PATENT DOCUMENTS

| | | | |
|---|---|---|---|
| 281,003 A | 7/1883 | Benton | |
| 1,254,687 A | 1/1918 | Hales | |
| 1,276,671 A | 8/1918 | Martin | |
| 1,532,082 A | 3/1925 | Schaefer | |
| 2,064,448 A | 12/1936 | Rieff | |
| 2,099,053 A | 11/1937 | Donnan | |
| 2,178,288 A | 10/1939 | Potts | |
| 2,218,187 A | 10/1940 | Wigle | |
| 2,268,066 A | 12/1941 | Brooke | |
| 2,513,730 A * | 7/1950 | Little, Sr. | 30/124 |
| 2,776,478 A | 1/1957 | Mercer | |
| 2,780,976 A | 2/1957 | Koering | |
| 3,430,704 A | 3/1969 | Alosi | |
| 3,451,486 A * | 6/1969 | Vostoris | 172/13 |
| 3,927,721 A | 12/1975 | Coppock | |
| 4,565,398 A * | 1/1986 | Poulin | 294/52 |
| 5,452,570 A * | 9/1995 | Schmid | 56/400.07 |
| 5,819,856 A * | 10/1998 | Meyer | 172/13 |

\* cited by examiner

*Primary Examiner*—Thomas B. Will
*Assistant Examiner*—Toni Newville
(74) *Attorney, Agent, or Firm*—Knobbe, Martens, Olson & Bear, LLP

(57) ABSTRACT

An attachment device detachably connects a gardening or cultivating tool to the blade of a garden hoe. This attachment device enables a tool such as weed cutters, rakes, pronged tools, and scythes to be detachably mounted to a hoe. The attachment device includes a sheet of metal wherein one or more U-shaped slots are formed along one edge. Tool retaining bolts are threaded into threaded holes in one side of the U-shaped slot(s) to tightly engage the hoe blade within the slot. A cutting tool having this attachment device maintains a spring loaded cutting blade which floats with respect to the hoe attachment device so that compression of the springs during use stores energy when the cutting blade hits an object for enhancing the cutting cycle and for reducing operator fatigue.

5 Claims, 6 Drawing Sheets

WEEDER TOOL ATTACHMENT

This application claims the benefit of U.S. Provisional Application No. 60/498,499, Filed Aug. 28, 2003, entitled "Weeder Tool Attachment" the entire contents of which is expressly incorporated by reference.

FIELD OF THE INVENTION

The present invention relates to improved weeder tools and accessory and gardening attachment tools.

SUMMARY OF THE INVENTION

Garden hoes are commonly used for multiple gardening and landscape purposes including preparing the soil for planting for weeding and cutting vegetation. However, the hoe blade is generally not the best tool for cutting weeds. Embodiments of this invention enable additional tools to be quickly and easily added to the hoe for supplementing or substituting another tool for the hoe blade.

Embodiments of this invention includes a weeder attachment cutting tool having a replaceable sharpened serrated blade. This tool is easily attached to the blade of the hoe. The serrated blade is mounted so as to be free to move relative to the hoe blade allowing the serrated blade to float up, down and differentially at the opposite ends of the serrated blade.

During weeding, as the serrated blade hits weeds, the impact energy is stored in springs within the cutting attachment which are caused to immediately recoil during cutting to provide a smooth and efficient cutting cycle. The energy absorption springs further absorb shock when this cutting blade impacts with the ground to reduce the operator's fatigue.

A feature of one of the embodiments described below is that the tool is constructed using two mating U-channel members which substantially enclose the shock absorption springs and prevent grass and weeds from clogging the springs.

DETAILED DESCRIPTION OF THE PREFERRED EMBODIMENT

Figure 1:
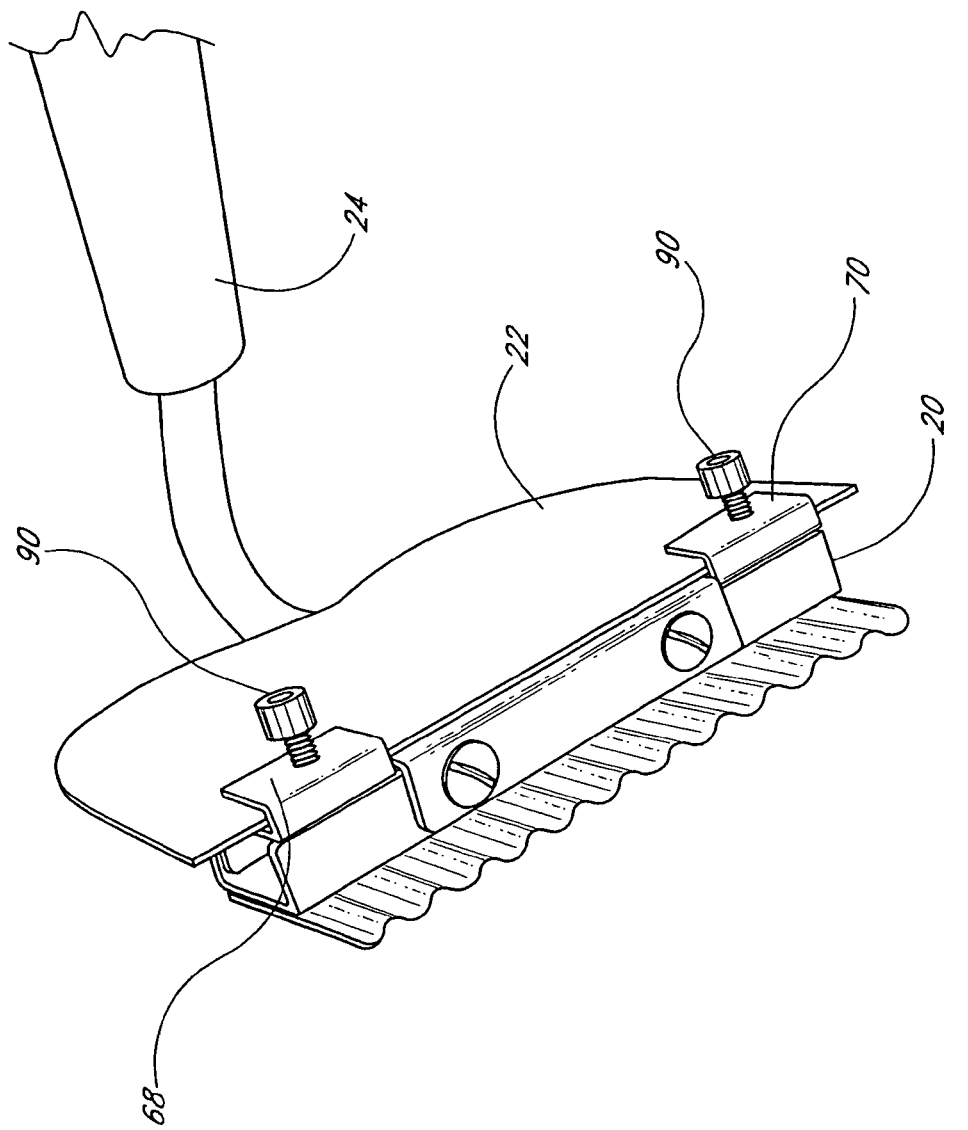
FIG. 1 is a perspective view showing an embodiment of the weeder tool attachment attached to the blade of a garden hole.
Figure 5:
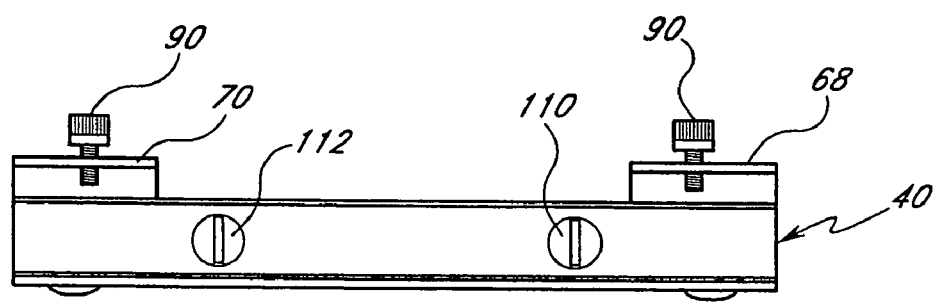
FIG. 5 is a top plan view of the weeder attachment tool of FIG. 1.

Referring now to FIG. 1, the preferred embodiment of the weeder attachment tool 20 is shown detachably mounted to the blade 22 of common gardening hoe 24. As will be described, this attachment tool 20 transforms the hoe into an excellent gardening weeding and cutting tool.

Figure 2:
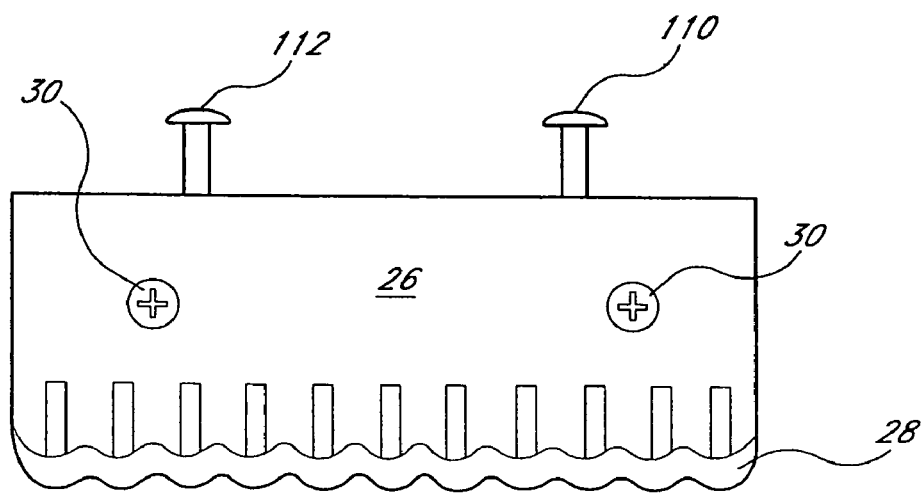
FIG. 2 is a front elevation view of the weeder attachment tool shown in FIG. 1.
Figure 6:
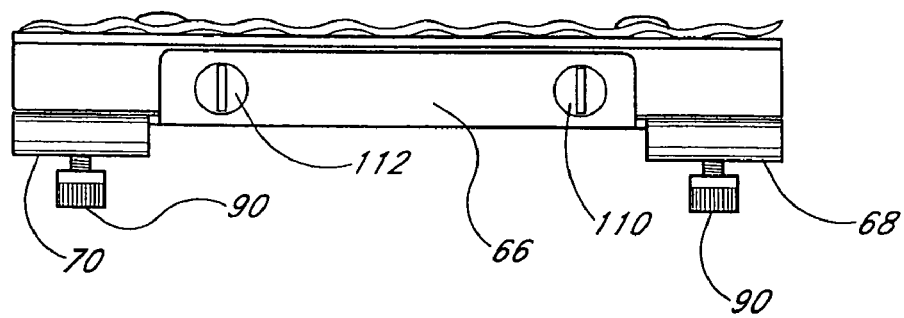
FIG. 6 is a bottom plan view of the weeder attachment tool of FIG. 1.
Figure 3:
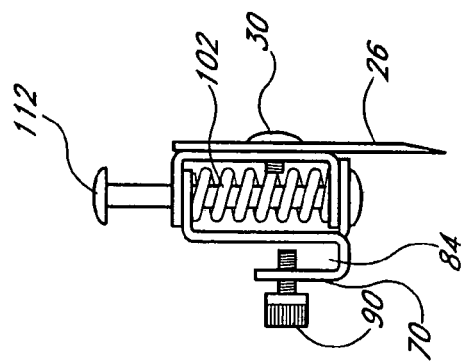
FIG. 3 is a right-end elevation view of the weeder attachment tool of FIG. 1.
Figure 7:
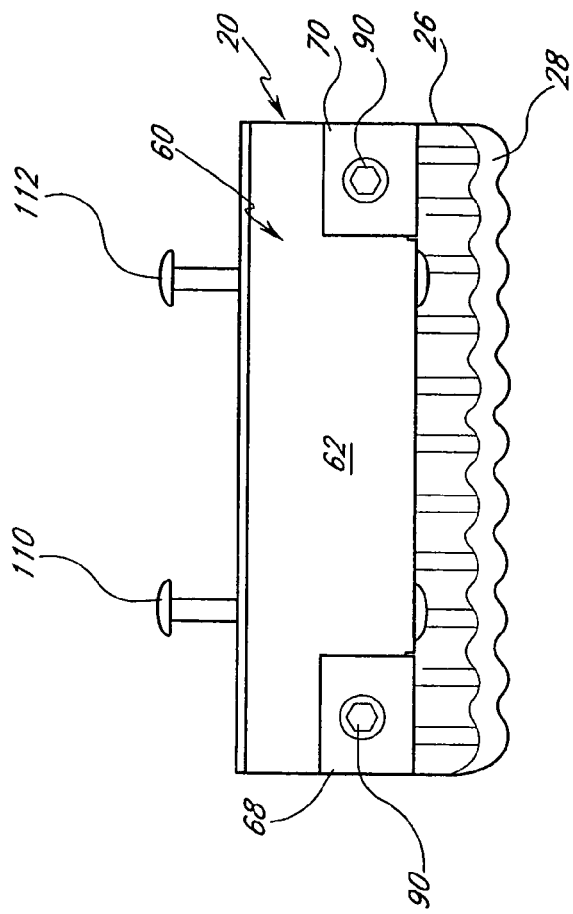
FIG. 7 is a back elevation view of the weeder attachment tool of FIG. 1.
Figure 4:
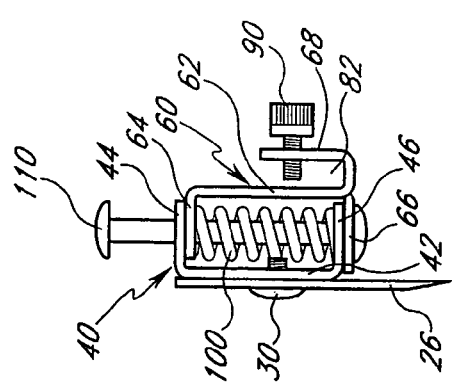
FIG. 4 is a left-end elevation view of the weeder attachment tool of FIG. 1.
Figure 11:
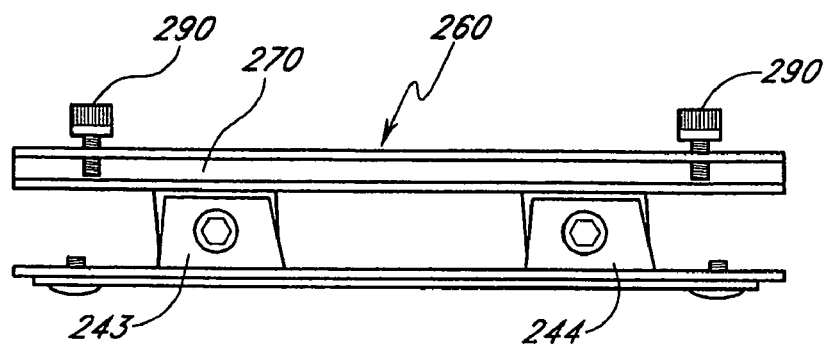
FIG. 11 is a top plan view of the weeder attachment tool of FIG. 8.
Figure 8:
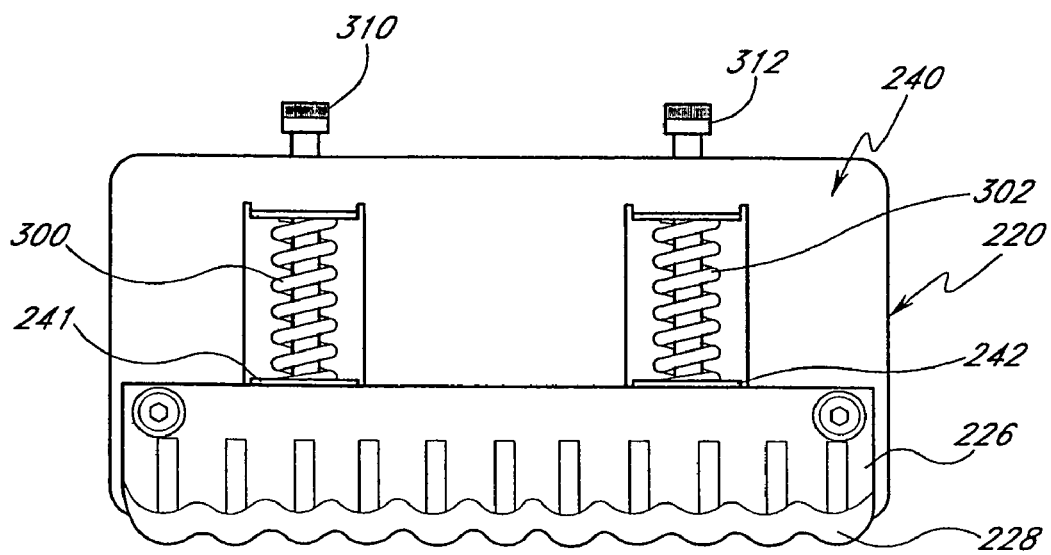
FIG. 8 is a front elevation view of another embodiment of the weeder attachment tool.
Figure 12:
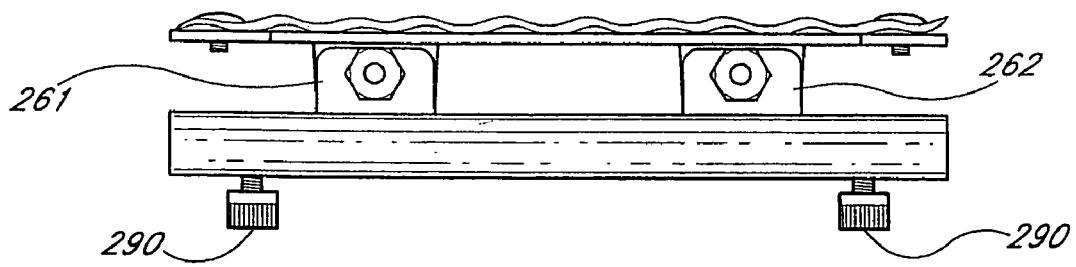
FIG. 12 is a bottom plan view of the weeder attachment tool of FIG. 8.
Figure 9:
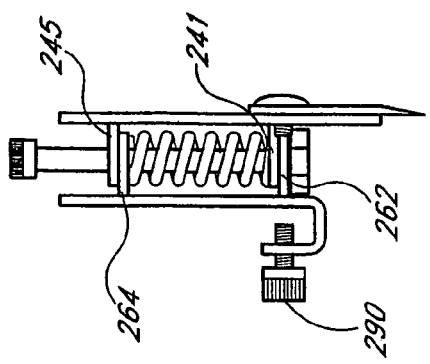
FIG. 9 is a right-end elevation view of the weeder attachment tool of FIG. 8.
Figure 13:
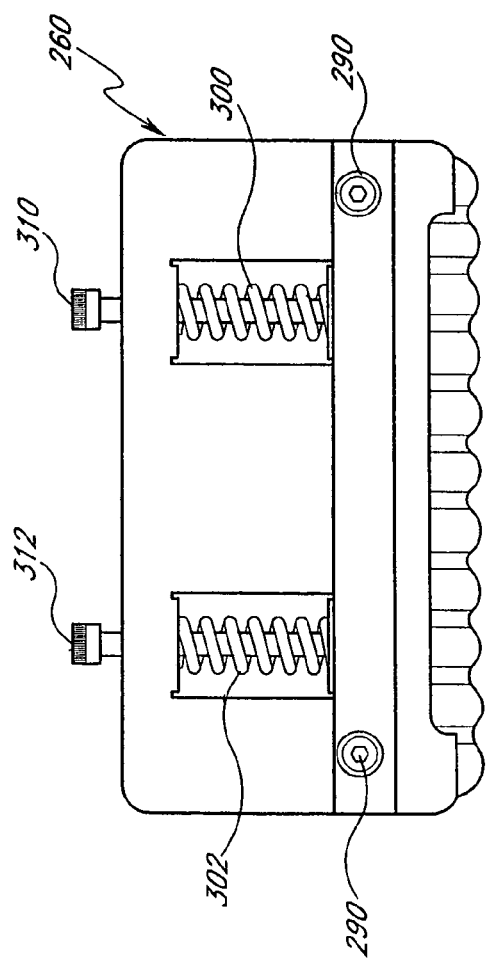
FIG. 13 is a back elevation view of the weeder attachment tool of FIG. 9.
Figure 10:
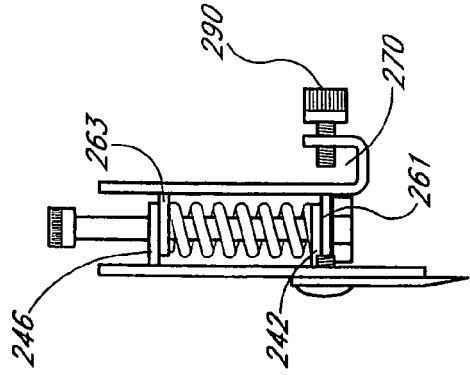
FIG. 10 is a left-end elevation view of the weeder attachment tool of FIG. 8.

As shown in FIGS. 1–7, attachment tool 20 includes a detachable blade 26 with a serrated sharpened edge 28 along its lower side. Advantageously, blade 26 is easily removable from tool 20 so that it can be quickly replaced when it becomes dulled with use. As shown in FIGS. 2, 3 and 4, blade 22 is attached to tool 20 by bolts 30 which screw into a spring biased movable body member 40. When these bolts 30 are unscrewed from the tool body member 40, blade 26 can be detached and another blade 26 attached in its place.

Member 40 is advantageously formed from steel channel having a U-shaped cross-section with a center portion 42 integral with side portions 44, 46. Two threaded holes in the center portion 42 mate with the two holes of blade 26 so that bolts 30 having mating threads can be bolted directly to the outer face of center 42 of channel 40.

Tool 20 further includes a hoe attachment member 60. As described in detail below, member 40 is spring biased to member 60 but free to float up, down and differentially at the ends of serrated blade 26, thus allowing weeder blade 26 to move relative to the hoe blade 22. In the preferred embodiment, hoe attachment member 60 is also advantageously constructed from steel channel having a U-shaped cross-section with a center portion 62, side portion 64 and side portion 66. However, unlike channel member 40, at both ends of side portion 66, end segments 68 and 70 are respectively formed by cutting side 66 and bending the ends of segments 68 and 70 through approximately 270° to juxtapose segments 68 and 70 with the outer face of center 62 to form hoe blade receiving slots 82, 84.

Tool retaining thumb bolts 90 are threaded into threaded holes in segments 68 and 70 to removably attach the weeder attachment tool 20 to a hoe blade 22 inserted into the hoe blade retaining slots 82, 84.

Weeder blade support member 40 and hoe attachment member 60 are coupled together so that the member 40 and its associated weeder blade 26 are suspended on two coil springs 100 and 102 and are free to move relative to the hoe blade 26. Springs 100 and 102 provide a floating coupling between weeder blade 26 and hoe blade 22. As best seen in FIGS. 3 and 4, one end of each of springs 100 and 102 rest on the inner surface of side portion 64 of channel member 60. The opposite ends of springs 100 and 102 engage the inner surface of side portion 46 of channel member 40.

Figure 14:
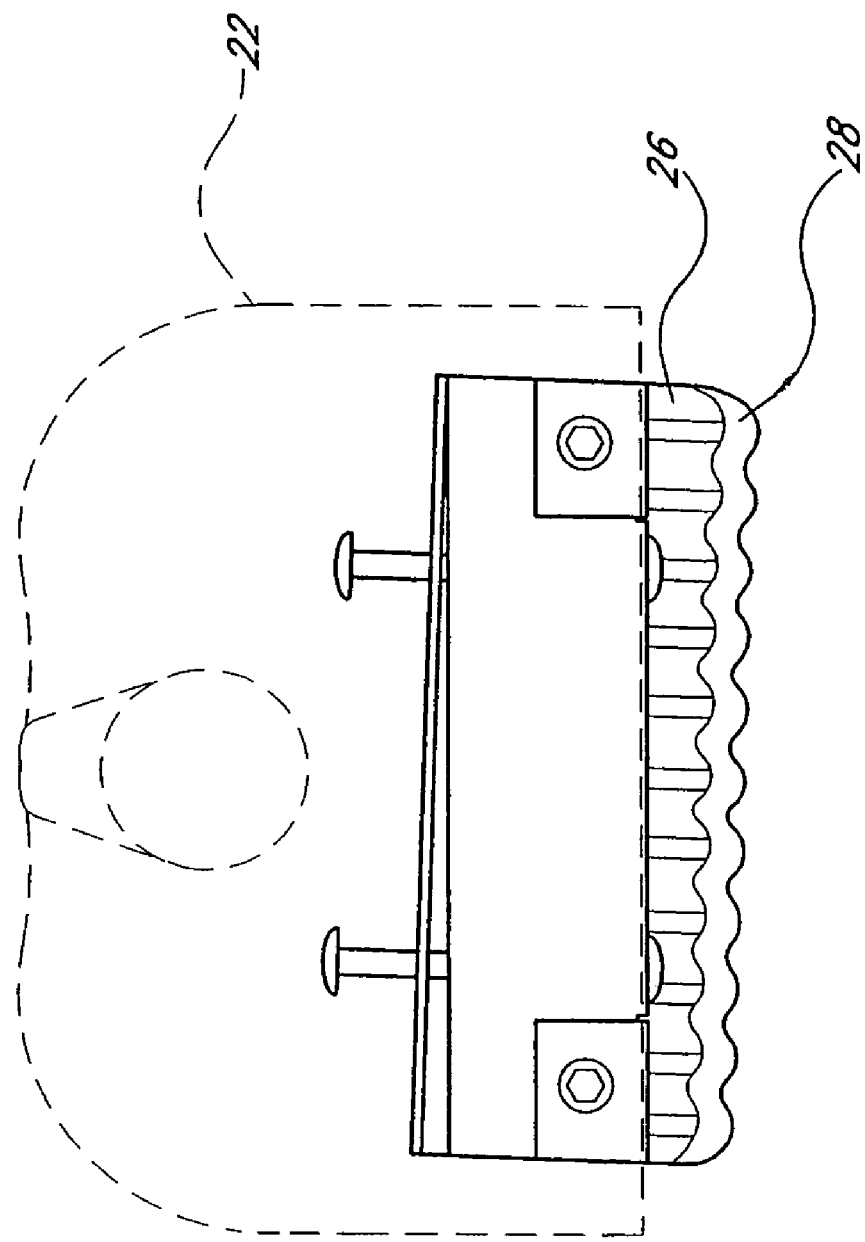
FIG. 14 illustrates the freedom of movement of the cutting blade relative to the hoe blade.

Alignment rods 110 and 112 respectively align the channel members 40 and 60 while retaining in place the springs 100, 102. As shown, the rods 110, 112 extend through openings in the side wall 44 of channel 40, through the interior of coil springs 100 and 102, and through openings in the side wall 66 of channel 60. Each end of the rods 110 and 112 are capped to prevent rods from falling off the tool 20. The diameter of these openings are sufficiently larger than the outer diameter of the alignment rods 110, 112 so that channel 40 and its associated blade 26 can float up, down and differentially with respect to channel 60. This functionality is shown in FIG. 14. At rest, the springs 100 and 102 bias the inner surface of side 44 of member 40 against the outer surface of side 64 of hoe attachment member 60. In use, when downward pressure is applied to an attached hoe blade 22, to cut weeds, the ends of respective channels 40 and 60 can move differentially because of the play permitted by the holes through which rods 110, 112 extend. As a result, as shown in FIG. 14, blade 26 can rotate to an angle that is skewed with respect to the hoe blade 22 during the cutting operation.

Further, as the serrated blade 28 hits the weeds, ground or other object, the impact energy is stored in the springs 100, 102. This stored energy causes the coil springs 100 and 102 to immediately recoil which forces downward motion of blade 26 to provide a smooth and efficient cutting cycle. These energy absorption springs 100, 102, further absorb shock when cutting blade 26 impacts with the ground to reduce the operator's fatigue.

Referring now to FIGS. 8–12, another weeder attachment tool embodiment 220 is shown.

Attachment tool 220 includes, as shown, a detachable blade 226 with a serrated sharpened edge 228 along its lower side. Advantageously, blade 226 is easily removable from tool 220 so that it can be quickly replaced when it becomes dulled with use.

Blade 226 is attached to body member 240. This member 240 is advantageously formed from a flat sheet of steel having cut out extension portions 241, 242, 243 and 244 bent at right angles to sheet 240.

A hoe attachment member 260 is also advantageously formed from a sheet of steel having cut out extension portions 261, 262, 263, 264. The bottom end of steel 260 is bent as shown to form an elongated U-shaped hoe blade retention slot 270. When hoe 24 is attached, the bottom edge of the hoe blade 22 rests at the bottom of slot 270 and detachably retained by bolts 290 which thread into matching holes in the outer side of slot 270.

Members 240 and 260 are aligned by alignment rods 310 and 312 which pass through respective openings in extensions 242, 244, extensions 261, 263, biasing shock absorption springs 300, 302, and respective openings in extensions 241, 243 and extensions 262, 264.

As a result, the cutting blade 226 is free to move relative to hoe retaining member. During cutting operation, the movement of blade 226, upon striking a weed, etc., results in compression of the springs 300, 302. The energy stored in the compressed springs causes an immediate downward movement of blade 226 to enhance the cutting operation while reducing operator fatigue. As in the previous embodiment shown in FIGS. 2–7, the openings in the extensions through which the alignment rods pass are sufficiently larger than the outer diameter of its rod so as to permit differential movement of the cutting blade 226 relative to the hoe blade.

While the embodiments described above each employ two coil springs, it will be apparent that the hoe attachment member can be used with cutting tools having no springs, one spring or more than two springs.

Other embodiments of the hoe attachment member 60 and 260 can advantageously mount accessories and tools other than a weeder tool to expand the utility of the common garden hoe. Thus, a family of garden tools such as rakes, pronged tools, scythes, can be fitted with hoe attachment members to provide the gardener with an extensive set of gardening tools that can be far more easily stored than the same set of tools would occupy with each having its own handle.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The embodiments described above are to be considered in all respects as illustrative only and not restrictive in any manner.

What is claimed is:

1. An attachment for a garden hoe, said attachment providing (i) a movable cutter blade having a shock absorber for absorbing shock when the weeder cutting blade impacts the ground, and (ii) an enclosure for preventing grass and weeds from clogging said shock absorber, said attachment comprising:

a pair of juxtaposed substantially U-shaped channel members, one of said U-shaped channel members providing a hoe blade attachment comprising two end segments formed by cutting a side of said U-shaped channel and bending said segments through approximately 270° to juxtapose said segments with the center section of said U-shaped channel member to form hoe blade receiving slots attachable to the blade of said garden hoe, the other of said U-shaped channel members providing a support member for said weeder cutting blade, said cutting blade being detachably mounted to the outside of the center section of the said other U-shaped channel member, said shock absorber comprising two coil springs located between an inner face of one of said channels and an inner face of the other of said channels, said shock absorber enabling said cutting blade to float up, down, and differentially with respect to the U-shaped channel attachable to said garden hoe blade, and said channels substantially enclosing said springs and providing said enclosure for preventing grass and weeds from clogging said springs.

2. The attachment for a garden hoe of claim 1 having a screw threaded through an opening in said bended segments, rotation of said screw causing a functional grip between the hoe blade and said attachment.

3. An attachment for a garden hoe, said attachment providing (i) a movable cutter blade having a shock absorber for absorbing shock when the weeder cutting blade impacts the ground, and (ii) an enclosure for preventing grass and weeds from clogging said shock absorber, said attachment comprising:

a pair of juxtaposed substantially U-shaped channel members, one of said U-shaped channel members providing a hoe blade attachment comprising two end segments formed by cutting a side of said U-shaped channel and bending said segments through approximately 270° to juxtapose said segments with the center section of said U-shaped channel member to form hoe blade receiving slots attachable to the blade of said garden hoe, the other of said U-shaped channel members providing a support member for said weeder cutting blade, said cutting blade being detachably mounted to the outside of the center section of the said other U-shaped channel member, said shock absorber comprising two coil springs located between an inner face of one of said channels and an inner face of the other of said channels, and said channels substantially enclosing said springs and providing said enclosure for preventing grass and weeds from clogging said springs.

4. An attachment for a garden hoe, said attachment providing (i) a movable cutter blade having a shock absorber for absorbing shock when the weeder cutting blade impacts the ground and (ii) an enclosure for preventing grass and weeds from clogging said shock absorber, said attachment comprising:

a pair of juxtaposed channel members, one of said channel members having segments bent to form hoe blade receiving slots, the other of said channel members providing a support member for said weeder cutting blade, said shock absorber comprising two coil springs located between an inner face of one of said channels and an inner face of the other of said channels, and said channels substantially enclosing said springs and providing said enclosure for preventing grass and weeds from clogging said springs.

5. An attachment for a garden hoe, said attachment including (i) a shock absorber for providing a floating platform relating to the blade of said hoe, and (ii) an enclosure for preventing grass and weeds from clogging said shock absorber, said attachment tool comprising:

a pair of juxtaposed U-shaped channel members, one of said channel members bent to form a hoe blade receiving a slot, the other of said channel members providing a support member for an auxiliary tool or accessory, said shock absorber comprising two coil springs located between an inner face of one of said channels and an inner face of the other of said channels, and said channels substantially enclosing said springs and providing said enclosure for preventing grass and weeds from clogging said springs.

* * * * *